United States Patent
Blenkiron et al.

(10) Patent No.: US 8,123,916 B2
(45) Date of Patent: Feb. 28, 2012

(54) APPARATUS FOR GENERATING GAS BY ELECTROLYSIS OF A LIQUID

(75) Inventors: Craig Stuart Blenkiron, Ovingham (GB); David John Ian Rowntree, Newton Hall (GB); Keith James Blundy, Newton Aycliffe (GB)

(73) Assignee: Domnick Hunter Limited, Birtley, County Durham (GB)

( * ) Notice: Subject to any disclaimer, the term of this patent is extended or adjusted under 35 U.S.C. 154(b) by 1556 days.

(21) Appl. No.: 10/547,868

(22) PCT Filed: Mar. 4, 2004

(86) PCT No.: PCT/GB2004/000939
§ 371 (c)(1),
(2), (4) Date: Jun. 26, 2006

(87) PCT Pub. No.: WO2004/079048
PCT Pub. Date: Sep. 16, 2004

(65) Prior Publication Data
US 2006/0260934 A1    Nov. 23, 2006

(30) Foreign Application Priority Data
Mar. 5, 2003    (GB) .................................. 0305005.1

(51) Int. Cl.
*C25B 9/00*        (2006.01)
*C25C 7/00*        (2006.01)
(52) U.S. Cl. ......... 204/265; 204/242; 204/263; 204/266
(58) Field of Classification Search .................. 204/242, 204/265, 266, 263
See application file for complete search history.

(56) References Cited

U.S. PATENT DOCUMENTS

| | | | |
|---|---|---|---|
| 3,870,616 A | | 3/1975 | Dempsey et al. |
| 4,255,246 A * | | 3/1981 | Davis et al. ................ 204/228.6 |
| 4,822,469 A | | 4/1989 | Shimomura et al. |
| 5,395,501 A | | 3/1995 | Rohrbacker et al. |
| 5,690,797 A | | 11/1997 | Harada et al. |
| 6,303,009 B1 | | 10/2001 | Bossard |
| 6,939,449 B2 * | | 9/2005 | Streckert et al. ............ 204/258 |
| 2002/0051898 A1 | | 5/2002 | Moulthrop, Jr. et al. |
| 2002/0153244 A1 | | 10/2002 | Speranza |

FOREIGN PATENT DOCUMENTS

| | | |
|---|---|---|
| DE | 3837354 A1 | 5/1990 |
| EP | 0 417 647 A1 | 3/1991 |
| EP | 1243671 A1 | 9/2002 |
| WO | 2004079048 A2 | 9/2004 |
| WO | WO 2004/079047 | 9/2004 |

* cited by examiner

*Primary Examiner* — Harry D Wilkins, III
*Assistant Examiner* — Zulmariam Mendez
(74) *Attorney, Agent, or Firm* — Maginot, Moore & Beck

(57) ABSTRACT

Apparatus for generating gas by electrolysis of a liquid comprises an electrolysis cell and a housing for the liquid. The housing comprises a first chamber for storing the liquid for supply to the electrolysis cell, the first chamber having an inlet for replenishing the liquid, and an outlet through which liquid is supplied from the first chamber to the electrolysis cell, and a second chamber for containing liquid which is a product of the electrolysis reaction and which is enriched with a first gaseous product of the electrolysis reaction, the second chamber having a gas outlet for controlled release of the first gaseous product. A first channel in the housing connects the first and second chambers. The channel provides a trap for liquid which can provide a barrier to passage of gas between the first and second chambers, irrespective of the level to which liquid in the first chamber falls during normal operation.

23 Claims, 4 Drawing Sheets

APPARATUS FOR GENERATING GAS BY ELECTROLYSIS OF A LIQUID

The present invention relates to apparatus for generating gas by electrolysis of a liquid.

U.S. Pat. No. 5,037,518 discloses apparatus for generating hydrogen by electrolysis of water. The apparatus comprises an electrolysis cell. Water is supplied to the cell from first and second reservoirs. Hydrogen which is discharged from the cell contains water, for example as droplets or as vapour. The hydrogen is separated from associated water in a chamber in which bulk water can collect. The hydrogen is discharged from the chamber and passes through dryer components which include a drying coil and a desiccant chamber, before discharge to an end use application.

Water from the electrolysis cell is discharged into an annex to the first reservoir which has a vent for associated oxygen. Accumulation of oxygen in the first reservoir itself is minimised in this way.

Similarly, water from the separation chamber is discharged into an annex to the second reservoir which has a vent for associated hydrogen. Accumulation of hydrogen in the second reservoir itself is minimised in this way.

The use of first and second reservoirs, with associated annexes, complicates the assembly of the apparatus disclosed in U.S. Pat. No. 5,037,518.

The present invention provides apparatus for generating gas by electrolysis of a liquid, which includes a housing comprising a first reservoir chamber, a second chamber for separation of liquid and associated reaction product gas, and an interconnecting channel.

Accordingly, in one aspect, the invention provides apparatus for generating gas by electrolysis of a liquid, comprising:
a. an electrolysis cell;
b. a housing for liquid with an inlet through which liquid in the housing can be replenished, which comprises:
  i. a first chamber for storing the liquid for supply to the electrolysis cell, having an outlet through which liquid can be supplied from the first chamber to the electrolysis cell,
  ii. a second chamber for containing liquid which is a product of the electrolysis reaction and which is enriched with a first gaseous product of the electrolysis reaction, the second chamber having a gas outlet for controlled release of the first gaseous product, and
  iii. a channel in the housing which connects the first and second chambers, in which the channel provides a trap for liquid which can provide a barrier to passage of gas between the first and second chambers, irrespective of the level to which liquid in the first chamber falls during normal operation.

The apparatus of the invention has the advantage that the housing can be provided simply and efficiently as a single component, which provides first and second chambers and the interconnecting channel. As a single component, the housing, comprising the first and second chambers and the first channel, can be manipulated in such a way that the parts thereof are fixed relative to one another. The materials of parts (first and second chambers and first channel) of a housing which is provided as a single component can be common. A housing which is provided as a single component can be formed from separate parts, which can be assembled together. The parts can be fitted together by bonding (for example by welding or using a separate bonding material), or relying on mechanical interconnection. One or more parts of the housing can be formed by moulding when they are formed from polymeric material. Preferably, the housing is formed as a single part by a process such as moulding. Formation of the housing as a single part simplifies assembly, for example removing the need to form seals between the first and second chambers and an interconnecting channel.

Preferably, the inlet for replenishing the liquid in the housing is provided in the first chamber.

The trap in the channel will generally be U-shaped, in which a wall extends downwardly into the channel, and defines the arms of the "U". The bottom wall of the "U" can be rounded so that it follows the side walls. The channel can be open laterally at its base so that it extends into an adjacent chamber; for example the channel can itself be provided by an elongate chamber which extends laterally, with one or more walls extending into the elongate chamber to define one or more generally U-shaped traps.

The channel can provide a barrier to passage of gas by ensuring that the trap remains full of liquid at the bottom of the downwardly extending wall so that the liquid level overlaps the wall. This can prevent migration of gas between the second and first chambers (other than in solution).

Ensuring that the trap remains full of liquid at the base of the "U", so that it overlaps the bottom of the wall, can be achieved by providing a step between the first and second chambers, in which the bottom of the wall which defines the "U" is lower than the step. This means that the liquid level in the first chamber can drop below the level of the step, while the liquid level in the second chamber remains at or close to the level of the step.

Ensuring that the trap remains full of liquid at the base of the "U", so that it overlaps the bottom of the wall, can be achieved by ensuring that the bottom of the wall which defines the "U" is located below the lowest level to which liquid in the first chamber falls during normal operation of the apparatus, for example below a predetermined minimum level for the liquid which is defined by a level control mechanism.

The thickness of the downwardly extending wall (which effectively defines the distance between the arms of the "U") will not generally be critical to the functioning of the apparatus.

The housing can be formed as a single piece. Alternatively, it can be formed from two or more pieces are then assembled to form the housing, for example using a bonding technique which does not use an additional material (especially welding), or using a bonding technique which uses an additional material such as an adhesive, or by soldering or brazing, or mechanically. The technique for forming the housing will depend on the material(s) from which it is made. Preferably, at least part of the housing is formed from a polymeric material. For example, the walls of the first chamber, or the walls of the second chamber, or both, can be formed from a polymeric material. Preferably, the walls of the first and second chambers are formed from the same material, especially a polymeric material.

When one or more parts, or all, of the housing is formed from a polymeric material, they are preferably formed by moulding. Examples of suitable moulding techniques include blow moulding, injection moulding, rotational moulding and vacuum forming. Preferably, the first and second chambers are formed together in a moulding operation, especially a rotational moulding operation.

Suitable polymers which can be used in the housing include polyolefins, especially polyethylene and polypropylene, polyamides, polyesters, polycarbonates etc. The polymer should be selected for appropriate physical properties (for example, melting or softening temperature, tensile properties etc) which will enable it to withstand the conditions to which it will be exposed during use, and also ease of manufacture.

A polymeric housing can include reinforcement elements to help it to withstand pressures imposed by gas which accumulates within it. For example, a polymeric housing can have tie rods moulded within it, extending between opposite walls, especially between opposite top and bottom walls.

When the housing is formed from a transparent material, or especially a translucent material, a visible signal can be provided by means of powered light source which is attached to the housing, especially the outside of the housing. When a power signal is supplied to the light source, the housing or liquid within it or both can then be illuminated to provide a visible signal, for example that the liquid level within the housing has exceeded a predetermined maximum (or intermediate) level, or has dropped below a predetermined minimum (or intermediate) level, or that there are impurities in the liquid in the housing (for example as determined using a conductivity sensor or other measuring device), or that a component within the apparatus is not functioning as intended. It an be preferred for the light source to comprise one or more light emitting diodes. The light source can include elements which show different colours when powered. The light source can be arranged to flash to indicate a condition of the apparatus.

The apparatus of the invention includes an electrolysis cell in which the liquid can be exposed to a potential difference between an anode and a cathode, so that the liquid is oxidised at the anode and is reduced at the cathode. For example, when the liquid is water, oxygen is generated at the anode and hydrogen is generated at the cathode. Known cells for electrolysis of water make use of a solid polymeric ion-exchange membrane for the electrolyte, for example based on a thin layer of an ion exchange membrane. A suitable ion exchange material is a sulphonated perfluorocarbon membrane such as that sold under the trade mark NAFION. Suitable electrodes can be based on catalytic systems, for example based on a mixture of platinum and iridium together with a platinised titanium screen. The construction of a suitable electrolysis cell is discussed in relation to FIG. 2 of U.S. Pat. No. 5,037,518.

It can be preferred in order to minimise the risk of damage to the electrolysis cell to control the purity of the liquid that is supplied to the cell. The apparatus can include a detector for impurities in the liquid. The detector can detect impurities in liquid in the first chamber. The detector can detect impurities in the liquid which are in the line extending from the first chamber to the electrolysis cell. The detector can measure a property of the liquid which is affected by the presence of impurities. Relevant properties might include, for example, conductivity, optical transmission characteristics (clarity, change in colour etc), etc. When the liquid is water, it will be preferred to detect impurities by measuring conductivity. Preferably, the supply of power to the cell is interrupted in the event that impurities are detected.

Preferably, the housing includes:
i. a third chamber for containing liquid which is a product of the electrolysis reaction and which is enriched with a second gaseous product of the electrolysis reaction, the third chamber having a gas outlet for controlled release of the third gaseous product, and
ii. a second channel in the housing which connects the third chamber to at least one of the first and second chambers, in which the channel provides a trap for liquid which can provide a barrier to passage of gas, irrespective of the level to which liquid in the first chamber is discharged during operation.

The advantage identified above of forming first and second chambers as a single component is enhanced when the housing includes a third chamber, and a second channel which connects the third chamber to at least one of the first and second chambers.

Preferably, the second channel connects the third chamber to the second chamber. This has the advantage that, if the gas outlet in the third chamber ceases to function adequately (for example because it becomes blocked), an increase in the pressure of the second gaseous product in the third chamber results in displacement of liquid in the second channel so that the second gaseous product is discharged into the second chamber. The combination of the first gaseous product in the second chamber and the second gaseous product which is discharged into the second chamber from the third chamber might be explosive (for example in the case of hydrogen and oxygen in apparatus which is used for the electrolysis of water). However, it is an advantage that this mixture is contained within the second chamber rather than the first chamber because the second chamber will generally have a smaller volume than the first chamber, so that the volume of the gas mixture will be smaller in the second chamber than would be the case in the first chamber. Accordingly, the series arrangement of the third, second and first chambers can help to minimise the adverse effects of an explosion in the event that a gas outlet fails to function adequately.

Preferably, the apparatus includes a level control mechanism to enable control over the level of liquid in the reservoir, in particular which prevents the level falling below a predetermined minimum level during operation of the apparatus. The level control mechanism will generally include a level detector; preferably, the level detector initiates a response in the event that the liquid reaches a predetermined level, which might be a maximum level, or a minimum level, or an intermediate level. The level detector can function mechanically, for example using a float. Movement of the float can cause an electrical switch to move between open and closed positions. The level detector can measure changes in conductivity according to whether the detector is immersed in the liquid, or according to a change in the depth to which the detector is immersed. It is preferred to use one or more level detectors which measure the conductivity of the liquid, especially when the liquid is water. The level detector can measure changes in the optical properties of fluid (liquid or gas) which are present in the first chamber: in particular, a signal can be generated because of the different optical characteristics of the liquid and air.

Preferably, the level control mechanism generates a signal when the level of the liquid in the first chamber exceeds a predetermined maximum level. The signal can be a warning signal, especially a visible signal or an audible signal or both, when the first chamber is filled manually. The signal can cause automatic supply apparatus to shut off the supply, when this is used to replenish the first chamber. The apparatus can include a level control mechanism which measures the level of liquid in the first chamber continuously, for example to be displayed on a display.

Preferably, the level control mechanism generates a signal when the level of the liquid in the first chamber is less than a predetermined minimum level. Generally, the supply of power to the cell will be interrupted in the event that the level of liquid is less than a predetermined minimum level. The level control mechanism can generate a signal when the level of liquid in the first chamber is above the predetermined minimum level. That signal can be a warning signal, especially a visible signal or an audible signal or both.

Preferably, the detector for the minimum level of liquid in the housing is provided in the second chamber. In order for the detector to be able to generate a signal when the level of liquid in the first chamber is less than a predetermined minimum level, it will then be above the level of any ridge which separates the first and second chambers. An advantage of locating the minimum level detector in the second chamber is that it is able to generate a signal when the level in the second chamber drops below the predetermined minimum level even when the level in the first chamber has not also dropped. For example, this can occur when the vent for gas from the second chamber is blocked, or in the event of an explosion condition in the second chamber.

Preferably, the inlet for replenishing the liquid in the first chamber has a central funnel part which extends downwardly into the first chamber to a point which is lower than the said predetermined minimum level of liquid in the first chamber. This has the advantage that a closure cap (for example, a cap which can engage the inlet by means of cooperating threads) on the inlet is not in direct contact with gas that is present in the first chamber between the liquid in the chamber and the upper surface of the chamber. This means that, in the event that a malfunction leads to the presence of an explosive gas in the first chamber, the closure cap on the inlet will not be exposed to the force of the explosion.

Preferably, the second chamber has an inlet for the liquid and associated gaseous product which is located above the predetermined minimum level of liquid in the first chamber, preferably around the mean level of the liquid in the first chamber during normal operation of the apparatus. This can facilitate separation of the liquid and associated gaseous product, and can minimise re-association of the liquid and the gaseous product. Preferably, the third chamber (when present) has a similar inlet.

Generally, the second chamber will extend above the maximum level to which the first chamber is normally filled with liquid, and the gas outlet will be provided above this maximum level. The portion of the second chamber which is above this maximum level can ensure that gas can be retained within the second chamber even when the level of liquid in the first chamber is at its maximum. Positioning the gas outlet above the said maximum level means that liquid will not be discharged through the gas outlet even when the level of liquid in the first chamber is at its maximum. It also means that a filter in the gas outlet (when present) will not get wet.

Preferably, the housing includes at least one other outlet for liquid which collects in the housing in a region thereof which is lower than the outlet through which liquid is supplied from the first chamber to the electrolysis cell.

Preferably, a portion of the wall of the housing which defines the first chamber is defined by a line of weakness so that the wall fails at the line of weakness when the pressure in the first chamber reaches an excessively high level. For example, a groove can be cut in the wall of the housing extending partway through its thickness. The groove can be generally rounded, especially circular so that, in the event of the pressure reaching a high level, especially if an explosive force is generated, a round portion of the wall of the first chamber breaks of, allowing release of pressure. The provision of a line of weakness has the advantage of providing control over how the first chamber will fail in the event that high pressure levels are obtained in the chamber. For example, the portion of the wall of the first chamber at which it fails can be arranged in a location within the apparatus such that external adverse effects are minimised. For example, the failure portion can be forced towards the interior of the apparatus so as not to cause injury to a nearby operator.

Preferably, the second chamber (and the third chamber, if present) includes a filter in its gas outlet to minimise ingress of contaminant material into the said chamber. The filter should prevent ingress of particulate contaminants, and also contaminants in liquid or vapour form, especially organic solvent vapours. Examples of suitable filters can be based on activated alumina and activated carbon, possibly impregnated with other components such as potassium permanganate, for example as sold by Jones & Attwood Limited under the trade marks JABLEND, JASORB and JACARB.

Preferably, the first chamber includes an outlet for controlled release of gas. Preferably, the gas outlet in the first chamber has a filter in it to minimise ingress of contaminant material into the said chamber. The filter can have generally the same functional characteristics as the filter discussed above for use in the second chamber.

Preferably, the ratio of the volume of the first chamber to the volume of the second chamber is at least about 20, more preferably at least about 30, especially at least about 40.

Preferably, the ratio of the volume of the first chamber to the volume of the third chamber is at least about 20, more preferably at least about 30, especially at least about 40.

Preferably, the ratio of the volume of the second chamber to the volume of the third chamber is not more than about 2, more preferably not more than about 1.5. Preferably, the value of the said ratio is at least about 0.5, more preferably at least about 1.5.

Preferably, the apparatus includes a separator device for separating the gas which is to be generated from the liquid.

Preferably, the separator device includes a separator chamber having a liquid outlet through which liquid is discharged to the second chamber, and a gas outlet, the gas outlet having a valve which closes when the liquid level in the separator chamber exceeds a predetermined level. The separator device can include a quantity of an adsorbent, especially a desiccant when the liquid to be adsorbed is water. Examples of suitable desiccants include alumina, silica and the like.

Preferably, the housing includes formations for fixing the separator device to the housing. For example, the separator device can be fastened to the housing mechanically by means of threaded fasteners. The housing can be provided with threaded bores to engage machine screws. When the housing is formed from a polymeric material, it can include threaded inserts which can engage the fasteners.

Embodiments of the present invention will now be described by way of example with reference to the accompanying drawings, in which.

Figure 1:
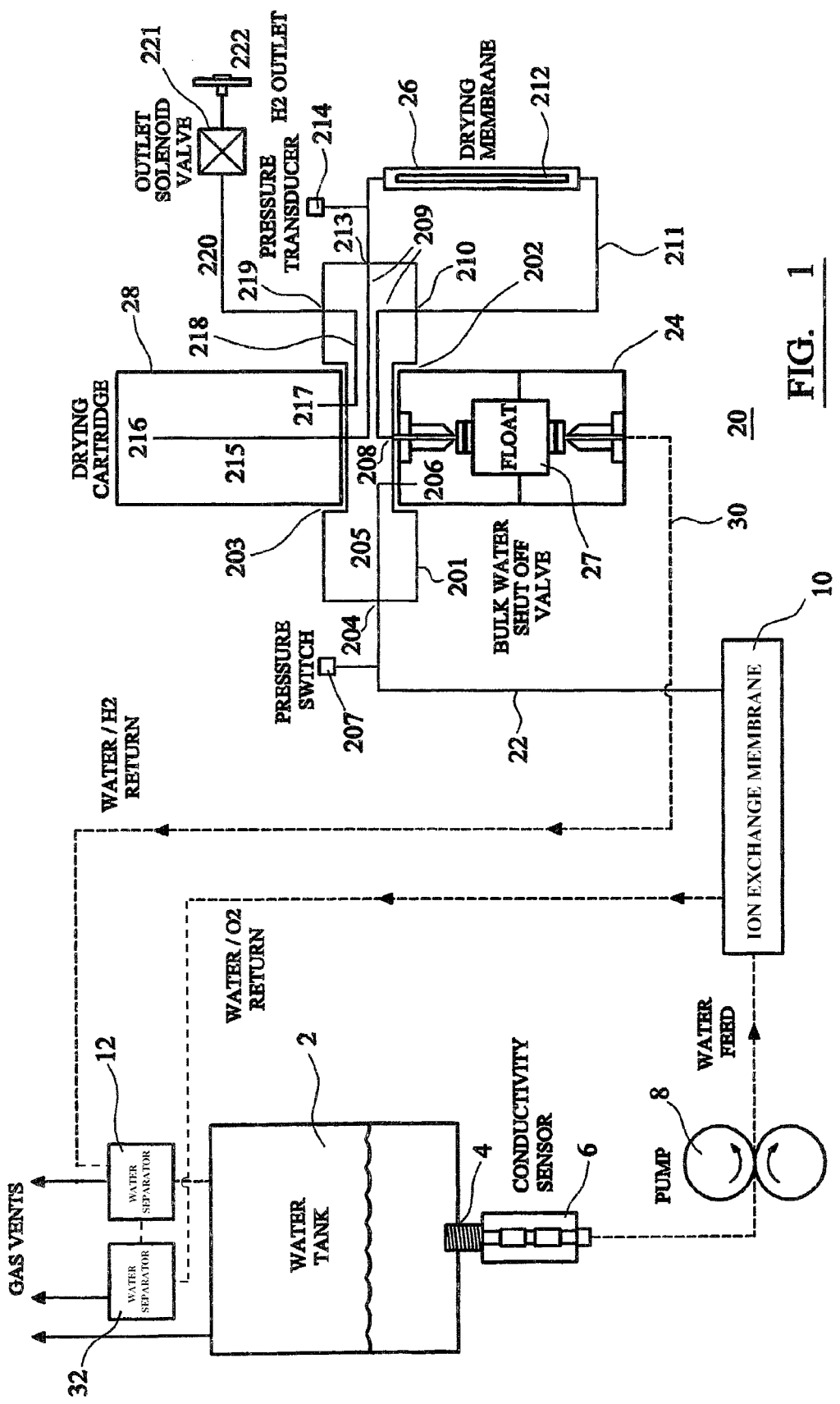
FIG. 1 is a schematic representation in the form of a flow chart, showing components of gas generation apparatus.

Referring to the drawings, FIG. 1 shows gas generation apparatus such as hydrogen generation apparatus in which water is exposed to a potential difference in an electrolysis cell. The discussion that follows will be restricted to this application, although the apparatus of the invention can be used with other liquids to generate other gases.

The gas generation apparatus comprises a reservoir 2 for the water which is to be treated. Water is discharged from the reservoir 2 through an outlet 4. The outlet has a conductivity sensor 6 mounted in it by which the presence of impurities in water from the reservoir can be detected. In the event that impurities are detected, by an increase in conductivity above a predetermined level, the power supply to the electrolysis cell can be interrupted.

Water from the reservoir is pumped by means of a pump 8 through an electrolysis cell 10 which contains an anode, a cathode and a solid polymeric electrolyte which is provided by an ion-exchange membrane, especially a sulphonated perfluorocarbon membrane such as that sold under the trade mark NAFION. Details of the construction of an electrolysis cell such as might be used in the apparatus of the present invention are disclosed in U.S. Pat. No. 3,870,616 and U.S. Pat. No. 5,037,518.

Water from the anode side of the electrolytic cell is pumped from the electrolytic cell to a reservoir separator chamber 32 in which oxygen which is associated with the water (carried by the water in solution or as dispersed bubbles) can separate from the water.

Hydrogen is discharged from the cathode side of the electrolysis cell into separator apparatus 20 through a line 22. The hydrogen that is supplied to the separator apparatus has water associated with it, as droplets or as vapour. The separator apparatus includes a manifold block 201 which is attached a separator chamber 24 and an adsorption chamber 28. The manifold block includes a first mounting point 202 at which the separator chamber 24 can be physically connected to the block, preferably by means of a screw or bayonet type fitting. The manifold block includes a second mounting point 203 at which the adsorption chamber 28 can be physically connected to the block.

The manifold block 201 has a plurality of conduits disposed internally and externally. The conduits enable fluid communication between the separator chamber 24 and the adsorption chamber 28. The mixture of hydrogen and water is conducted through line 22 to a manifold inlet 204 which is connected to an inlet 206 located at the top of the separator chamber by means of an inlet conduit 31 within the manifold block 23. Line 22 can have a pressure switch 207 in it which closes the line when the pressure in it exceeds a predetermined level, for example in the event that the pressure in the chamber 24 increases because the water outlet line is blocked and water accumulates in the chamber, closing the float valve 27. The pressure switch may be attached to the manifold block, disposed at the manifold inlet 204.

The hydrogen/water mixture enters the top of the separator chamber 24 through the inlet 206 and liquid water collects at its base. Hydrogen can escape from the chamber 24 through an outlet 208 located at the top of the chamber. The discharge of hydrogen from the chamber is controlled by means of a float valve 27. The float valve is sensitive to the level of water in the chamber. The float valve closes the hydrogen outlet 208 from the chamber when the level of water reaches a predetermined level, to prevent collected water passing from the chamber into other components of the separator apparatus, for example in the event that water cannot be discharged from the chamber.

After passing through the separator outlet 208, the hydrogen passes through a connecting conduit 209 within the manifold block to a connector outlet 210, through which the hydrogen flows into an external conduit 212 disposed outside the manifold block. The external conduit is provided by a drying membrane material, preferably a moisture exchange drying membrane (for example a membrane made from a sulphonated perfluorocarbon membrane such as that sold under the trade mark NAFION). The use of a drying membrane of this general kind is disclosed in U.S. Pat. No. 5,037,518.

Hydrogen which has passed through the external conduit is supplied to a connector inlet 213 in the manifold, through which the hydrogen flows into the connecting conduit 209 within the manifold block. A pressure sensor 214 can be included between the external conduit and the connecting conduit 209 in the manifold block so as to detect undesirable increases in the pressure. It can also detect unwanted reductions in that pressure which can indicate a leak in the line through which hydrogen is supplied to the end use application.

The pressure sensor can be disposed in the external conduit or at the connector inlet. Preferably, the pressure sensor is attached to the manifold block.

The hydrogen in the connecting conduit then passes into an adsorption chamber 28 through an inlet 216, the adsorption chamber being physically connected to the manifold block at the second mounting point 203. Preferably, the hydrogen is conducted in a line 215 within the adsorption chamber before being released into the adsorption chamber at the top. The adsorption chamber preferably contains a desiccant such as silica gel or a molecular sieve or both. The adsorption chamber 28 has an outlet 217 located near the bottom of the chamber through which the dried hydrogen is released into a conduit 218 within the manifold block. By locating the inlet 216 and outlet 217 at opposite ends of the adsorption chamber, the hydrogen has to pass through the majority of the length of the adsorption chamber, and therefore its exposure to the adsorbent is maximised. The relative positions of the inlet 216 and outlet 217 may be reversed.

The conduit 218 is connected at an outlet 219 to a line 220 through which the hydrogen passes to an outlet 222 that is adapted for connection to an end use appliance. The line 220 can include a valve, preferably a solenoid valve 221, which can close the outlet 222 when the apparatus is not in use, or when the pressure in the line is either too high or too low (perhaps due to a leak).

Water which collects in the separator chamber 24 is supplied through a line 30 to a reservoir separator chamber 12 in which hydrogen which is associated with the water (carried by the water in solution or as dispersed bubbles) can separate from the water.

Figure 2:
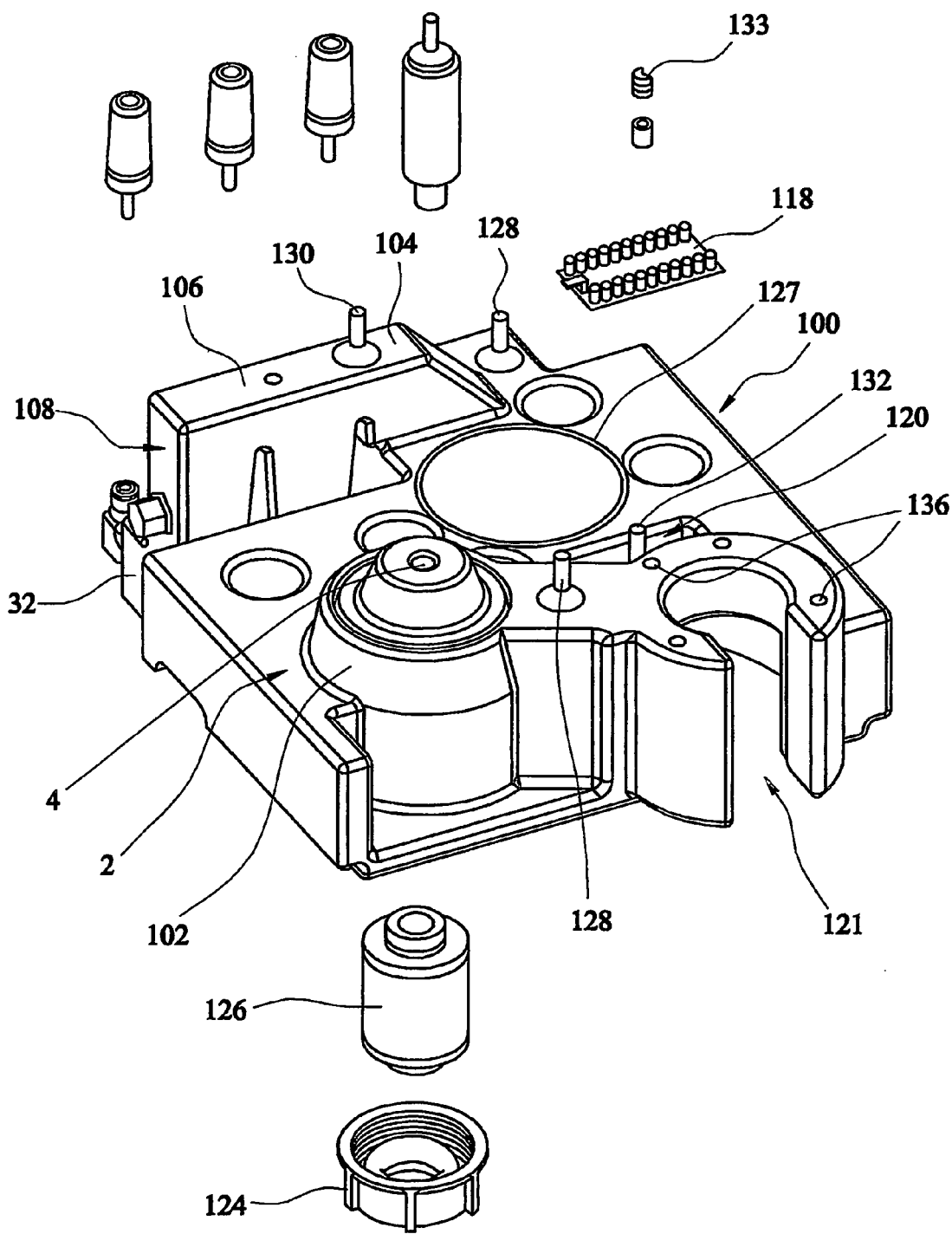
FIG. 2 is an isometric view from the front of the bottom of the housing of the apparatus shown in FIG. 1.
Figure 3:
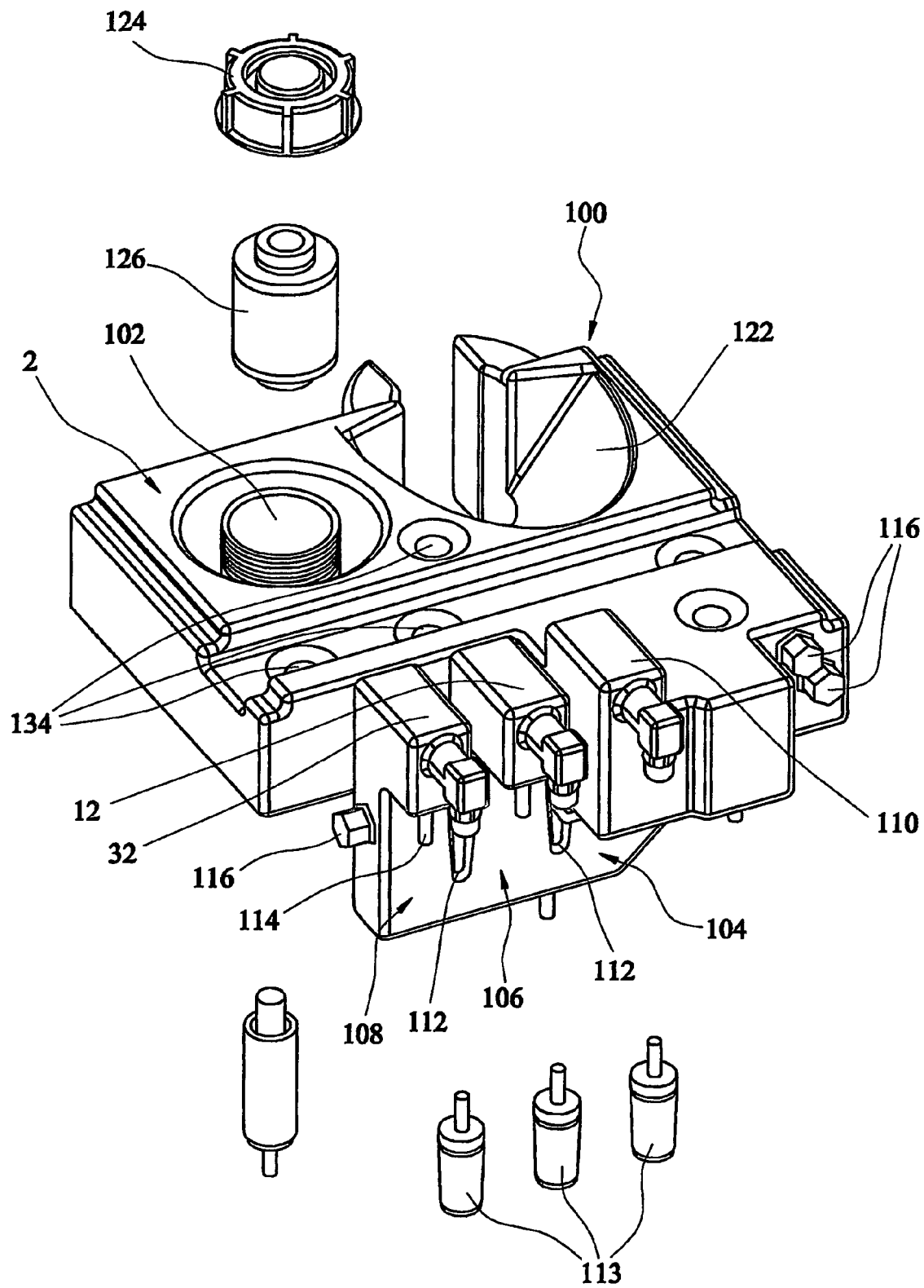
FIG. 3 is an isometric view from the back of the top of the housing of the apparatus shown in FIG. 1.
Figure 4:
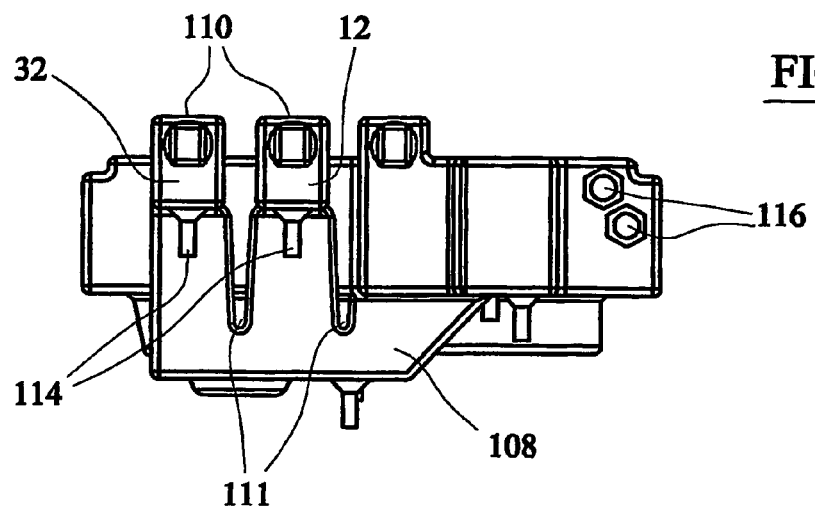
FIG. 4 is a view of the back of the housing, partially in section.

FIGS. 2, 3 and 4 show a housing 100 which incorporates the reservoir 2 and the first and second reservoir separator chambers 12, 32. In relation to the discussion of the housing shown in FIGS. 2 and 3, the reservoir will be referred to as the first chamber, and the first and second reservoir separator chambers will be referred to as second and third chambers, respectively. The housing is formed as a single moulding from a polyolefin such as polyethylene or polypropylene. A preferred technique for forming the housing involves rotational moulding.

The housing has an inlet 102 for water to be supplied to the first chamber 2. The first chamber is connected to the second and third chambers 12, 32 by means of first and second channels 104, 106. The channels can be considered as sections an elongate chamber 108 which extends along the back of the housing, at a level below the base of the first chamber 2.

The second and third chambers 12, 32 are substantially identical in shape and configuration. Each of them communicates with the elongate chamber 108 (see especially FIGS. 2 and 4), and has an enlarged head portion 110 which has in it a gas outlet. The chambers are separated by walls 111 which extend downwardly into the chamber. The walls each define a U-shaped trap. When the elongate chamber is filled with water to a depth which covers at least the bottom of each of the walls, the wall and the water in the elongate chamber provide a gas impermeable barrier between adjacent chambers. During normal operation of the apparatus of the invention, water will remain in the elongate chamber to sufficient depth to ensure that it covers at least the bottom of each of the walls because the bottom of each of the walls 111 is below the minimum depth to which the water in the first chamber drops, and because of the step between the water outlet 4 and the second and third chambers 12, 32 which is higher than the bottom of each of the walls.

As shown in FIG. 3, each of the gas outlets has a vent component 112 mounted in it, to which can be fitted a removable filter cartridge 113. The filter cartridges prevent ingress of contaminants into the housing. Suitable filter materials include activated carbon materials, activated alumina materials, activated silica materials etc. The enlarged head portion 110 of each of the second and third chambers has an inlet 114 for water which has gas associated with it. The water which is admitted to the second chamber 12 has hydrogen associated with it, and the water which is admitted to the third chamber 32 has oxygen associated with it. The water inlets 114 are located at about the mean level of water in the first chamber during normal operation of the apparatus.

The housing has openings 116 formed in its back wall and in a wall of the third chamber to receive level sensors for liquid within it. One of the sensors is positioned to detect when the liquid level reaches a predetermined maximum level, and the other of the sensors is positioned to detect when the liquid level reaches a predetermined minimum level. Preferably, the minimum level sensor is provided in the second chamber or the third chamber, so that it can detect a reduction of the level of liquid in that chamber which is due to, for example a blocked gas output vent or an explosion condition in that chamber, in addition to a reduction in the level of water in the first chamber. Intermediate sensors can be provided to measure when liquid levels reach intermediate levels, for example to provide a warning that a maximum level or a minimum level is soon to be exceeded. An array 118 of light emitting diodes can be provided in a recess 120 in the base of the housing, which can illuminate the housing according to the signals provided to it by sensors, including level sensors, sensors as to the purity or other condition of the liquid etc. The translucence of the material of the housing arising from the use of a polymer such as a polyolefin can encourage the illumination of the housing in this way making the warning signal provided by the diodes readily visible. The signal which is generated when the water reaches the minimum water level causes the supply of power to the electrolysis cell to be interrupted to avoid the cell running with inadequate water: this can damage the cell. A recess 121 in the housing, defined by an inclined face 122, towards the front of the housing, can facilitate visual inspection of the water level. It can be provided with markings to help with this.

The first chamber 2 is generally flat in the sense that its depth is smaller than its width and its length. However, it has a protruding circular protrusion located below the inlet 102, which has a discharge outlet opening 4 in it through which water can be discharged to the conductivity sensor 6, for supply to the conductivity cell. The inlet 102 includes an inlet tube which extends into the first chamber to a level which is lower than the lowest level to which the water will drop during normal operation of the apparatus. The inlet tube can be closed by a cap 124. The inlet tube can contain a filter 126 to minimise the risk of particulate and ionic impurities (which might damage the electrolysis cell) being introduced into the first chamber. It can be particularly preferred for a filter in the inlet tube to reduce the ionic content in the water in order to reduce ionic conductivity.

The housing has a circular groove 127 cut into its lower face to define a circular area of the wall. The groove represents a line of weakness at which the housing can open in the event of excessive pressure within it, especially in the event of an explosion within the housing.

The housing has a number of additional outlet mouldings 128 provided on its lower face. Preferably, the housing is moulded with each of the outlet mouldings closed, so that those outlet mouldings which need to be used to drain liquid from the housing which is retained when the housing is emptied through the discharge outlet opening 4 can be opened by removing the tip by cutting (including drilling). This applies particularly the outlet moulding 130 on the elongate chamber 108 which provides the first and second channels extending between the chambers 2, 12, 32. One of the outlet mouldings 132 can be used to locate the array 118 of light emitting diodes which is used to provide visible warning signals, which can be retained on the outlet moulding mechanically, for example by means of a circlip.

The housing has a number of tie rods 134 moulded within it extending between the opposite top and bottom walls of the first chamber 2. These can enhance the ability of the housing to withstand internal pressure.

The housing has a plurality of internally threaded nuts 136 moulded into its lower face in an array around the recess 121. These can receive threaded machine screws to fix apparatus for separating hydrogen gas from associated water carried with the gas as droplets or as vapour.

Figure 5:
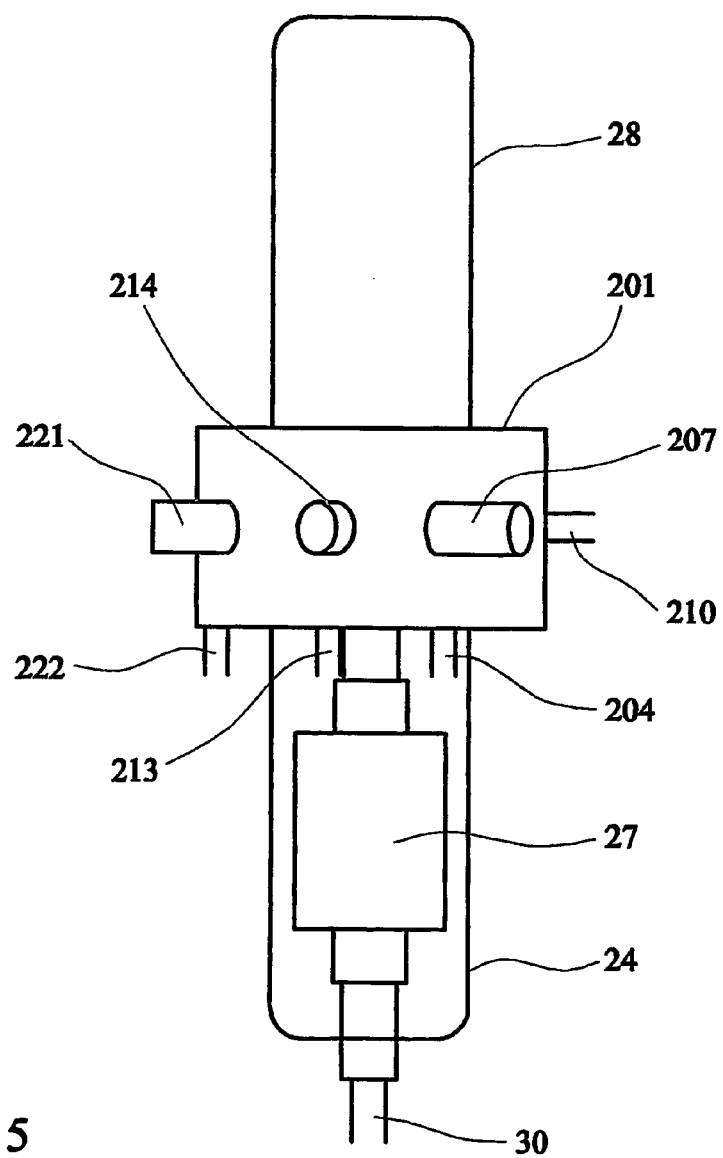
FIG. 5 is an isometric view of separator apparatus which can be fitted to the housing, to separate a gaseous reaction product from liquid which is carried with it.

Separator apparatus (see, e.g., FIG. 1 and FIG. 5) comprises a manifold block 201 with the separator chamber 24 and the adsorption chamber 28 physically connected to it. In the particular embodiment shown the separator chamber is located below the manifold block, and the adsorption chamber is located above the manifold block. The separator apparatus includes pressure sensors 207 and 214, a solenoid valve 221, inlets 204 and 213, and outlets 210 and 222. The manifold block can have bores extending through it, in the peripheral region outside the separator and adsorption chambers, for receiving fasteners such as machine screws whose ends can be received in the nuts in the bottom face of the housing 100. Separator apparatus with such features is disclosed in an application which is filed with the present application which claims priority from UK patent application no. 0305007.7. Subject matter disclosed in the specification of that application is incorporated in this specification by this reference.

When the apparatus of the invention is in use, water is maintained at a level in the housing between the maximum and minimum levels provided in the openings 116 in the back wall. If the water level falls between the minimum level, Water is supplied from the first chamber 2 of the housing 100 through the outlet 122 to the conductivity sensor 6.

Water is fed from the anode side of the electrolytic cell to the third chamber 32. The water has oxygen associated with it (in solution or as dispersed bubbles) which can separate from the water in the third chamber. Oxygen which separates from the water can vent to atmosphere through the vent component 112 mounted in it and the filter cartridge 113.

Water is fed from the separator apparatus 20 to the second chamber 12. The water has hydrogen associated with it (in solution or as dispersed bubbles) which can separate from the water in the second chamber. Hydrogen which separates from the water can vent to atmosphere through the vent component 112 mounted in it and the filter cartridge 113.

Water is maintained in the elongate chamber 108 to a depth such that the bottom of each of the walls 111 is immersed in the water. This ensures that gas is not able to pass between adjacent chambers through the elongate chamber, at least during normal operation of the apparatus. Accordingly, hydrogen and oxygen are maintained separately in the enlarged head portions of the second and third chambers, from where they can vent to atmosphere.

In the event of failure of one of the vents (in particular if it were to become blocked so that pressure in the respective chamber increases), or in the event of an explosion condition in a chamber, water in the trap can be displaced so that the gas flows into the next adjacent chamber. This can be detected by a minimum water level detector in the chamber in question, and can lead to the interruption of power to the electrolysis cell. If the failure is in the chamber 32, oxygen will flow into the chamber 12 in which hydrogen has collected. The potentially explosive mixture is contained within a space which is smaller than the corresponding space in the first chamber so that, in the event of an explosion, the quantity of the explosive gas mixture is small. If the failure is in the chamber 12, hydrogen will flow into the chamber 2 and possibly also into the chamber 32. The volume of the chamber 32 is the same as that of the chamber 12. In the absence of hydrogen in the first chamber, the risk of explosion as a result of an increase in the oxygen concentration of the collected gas is small.

If failures occur in both the second and the third chambers, oxygen and hydrogen can collect in the first chamber. Gas can vent from the first chamber through the vent and filter. In the event of an explosion in the first chamber, the bottom wall of the first chamber fails by blowing out the circular region defined by the groove 127.

The invention claimed is:

1. An apparatus for generating gas by electrolysis of a liquid, comprising:
   an electrolysis cell configured to carry out an electrolysis reaction with liquid that produces (i) a first product containing gaseous hydrogen and liquid, and (ii) a second product containing liquid and gaseous oxygen;
   a separator device in fluid communication with a first outlet of the electrolysis cell so that the separator device receives the first product containing gaseous hydrogen and liquid, said separator device being configured to separate liquid that is mixed with gaseous hydrogen so as to produce a third product containing liquid and gaseous hydrogen; and
   a housing configured as a single component, the housing including:
   i. a supply reservoir configured to store liquid therein and having an outlet that is in fluid communication with an inlet of the electrolysis cell,
   ii. a first separator reservoir in fluid communication with a second outlet of the electrolysis cell so that the first separator reservoir receives the second product containing liquid and gaseous oxygen, the first separator reservoir having a first gas outlet for controlled release of gaseous oxygen, and
   iii. a first channel in the housing which fluidly connects the supply reservoir and the first separator reservoir, in which the first channel provides a first trap for liquid which is configured to provide a first barrier to passage of gas between the supply reservoir and the first separator reservoir irrespective of the level to which liquid in the supply reservoir falls during normal operation, and
   iv. a second separator reservoir in fluid communication with an outlet of the separator device so that the second separator reservoir receives the third product containing liquid and gaseous hydrogen, the second separator reservoir having a second gas outlet for controlled release of gaseous hydrogen,
   in which the supply reservoir, the first separator reservoir, the first channel, and the second separator reservoir are fixed relative to one another to allow the housing to be manipulated as a single component.

2. The apparatus as claimed in claim 1, in which the first separator reservoir includes a first filter in the first gas outlet that is configured to reduce ingress of contaminant material into the first separator reservoir.

3. The apparatus as claimed in claim 1, in which the housing includes a housing inlet, and the housing inlet is provided in the supply reservoir.

4. The apparatus as claimed in claim 1, in which the housing further includes:
   a second channel in the housing which fluidly connects the the second separator reservoir to the first separator reservoir, in which the second channel provides a second trap for liquid which is configured to provide a second barrier to passage of gas, irrespective of the level to which liquid in the supply reservoir falls during operation.

5. The apparatus as claimed in claim 4, in which the second channel connects the second separator reservoir to the first separator reservoir.

6. The apparatus as claimed in claim 2, in which the second separator reservoir includes a second filter in the second gas outlet that is configured to reduce ingress of contaminant material into the second separator reservoir.

7. The apparatus as claimed in claim 1, in which the supply reservoir includes a gas outlet for controlled release of gas.

8. The apparatus as claimed in claim 1, further comprising a level control mechanism configured to prevent the level of liquid in the supply reservoir falling below a predetermined minimum level during operation of the apparatus.

9. The apparatus as claimed in claim 7, in which the level control mechanism includes a minimum liquid level detector that is located in the first separator reservoir.

10. The apparatus as claimed in claim 3, in which the housing inlet has a central funnel part which extends downwardly into the supply reservoir to a point which is lower than the said predetermined minimum level of liquid in the supply reservoir.

11. The apparatus as claimed in claim 7, in which the housing includes at least one other outlet for liquid which collects in the housing in a region thereof which is lower than the outlet of the supply reservoir.

12. The apparatus as claimed in claim 1, in which:
   the separator device is further configured to separate liquid that is mixed with gaseous hydrogen so as to produce a fourth product containing gaseous hydrogen, and
   the separator device includes a separator chamber having a liquid outlet through which the third product is discharged to the first separator reservoir, and a gas outlet through which the fourth product is discharged, the gas outlet having a valve which closes when the liquid level in the separator chamber exceeds a predetermined level.

13. The apparatus as claimed in claim 1, in which the separator device includes a quantity of an adsorbent.

14. The apparatus as claimed in claim 1, in which the housing includes formations for fixing the separator device to the housing.

15. The apparatus as claimed in claim 1, in which the housing is formed at least partly from a polymeric material.

16. The apparatus as claimed in claim 15, in which the supply reservoir and the first separator reservoir are formed from the same polymeric material.

17. The apparatus as claimed in claim 15, in which the supply reservoir and the first separator reservoir are formed together in a molding operation.

18. The apparatus as claimed in claim 1, in which a portion of a wall of the housing which defines the supply reservoir is defined by a line of weakness so that the wall fails at the line of weakness when the pressure in the supply reservoir reaches an excessively high level.

19. The apparatus as claimed in claim 1, in which the supply reservoir, the first separator reservoir, and the first channel are formed as separate pieces which are assembled together to form the housing as a single component.

20. The apparatus as claimed in claim 1, in which the supply reservoir, the first separator reservoir, and the first channel are formed as a single piece.

21. The apparatus as claimed in claim 1, in which walls of the supply reservoir and the first separator reservoir are formed from the same material.

22. The apparatus as claimed in claim 1, in which the supply reservoir, the first separator reservoir, the first channel, the second separator reservoir, and the second channel are fixed relative to one another to allow the housing to be manipulated as a single component.

23. The apparatus as claimed in claim 1, in which:
the electrolysis cell includes an anode portion and a cathode portion,
the cathode portion includes the first outlet of the electrolysis cell, and
the anode portion includes the second outlet of the electrolysis cell.

* * * * *